United States Patent

Kanki

[11] Patent Number: 5,506,779
[45] Date of Patent: Apr. 9, 1996

[54] ROUTE SEARCHING APPARATUS

[75] Inventor: Kenichiro Kanki, Kasuga, Japan

[73] Assignee: Matsushita Electric Industrial Co., Ltd., Osaka, Japan

[21] Appl. No.: 242,723

[22] Filed: May 13, 1994

[30] Foreign Application Priority Data

May 13, 1993  [JP]  Japan ................................. 5-111238

[51] Int. Cl.[6] .................................................. G06F 165/00
[52] U.S. Cl. ......................... 364/449; 364/444; 340/990; 340/995
[58] Field of Search .................................... 364/443, 444, 364/449; 73/178 R; 340/988, 990, 995

[56] References Cited

U.S. PATENT DOCUMENTS

| | | | |
|---|---|---|---|
| 4,796,189 | 1/1989 | Nakayama et al. | 364/449 |
| 4,937,753 | 6/1990 | Yamada | 364/449 |
| 4,962,458 | 10/1990 | Verstraete | 364/444 |
| 5,109,344 | 4/1992 | Kakihara et al. | 364/444 |
| 5,115,399 | 5/1992 | Nimura et al. | 364/449 |
| 5,168,452 | 12/1992 | Yamada et al. | 340/995 |
| 5,191,532 | 3/1993 | Moroto et al. | 364/449 |
| 5,204,817 | 4/1993 | Yoshida | 364/444 |
| 5,359,527 | 10/1994 | Takanabe et al. | 364/444 |

FOREIGN PATENT DOCUMENTS

| | | |
|---|---|---|
| 63-10300 | 1/1988 | Japan . |
| 63-163210 | 7/1988 | Japan . |
| 2-85000 | 7/1990 | Japan . |
| 2-306400 | 12/1990 | Japan . |
| 4-24200 | 2/1992 | Japan . |

*Primary Examiner*—Gary Chin
*Attorney, Agent, or Firm*—Ratner & Prestia

[57] ABSTRACT

The disclosed route searching apparatus sets a searching range in a specified area (determined by the distance between two points), around a line segment linking the specified two points, when the user specified a departure point and a destination point on the map, judges if there is a trunk road within the searching range, and determines and displays the traveling route, if present, passing through such road. That is, a searching range in an area depending on the distance between two locations is set preliminary, and the traveling route is searched by limiting to this range, and therefore the traveling route effectively using the trunk road located in the vicinity can be searched and displayed in a short time.

7 Claims, 10 Drawing Sheets

Example of creating data on the basis of roads

| Road number | Road class | Nodes for composing road |
|---|---|---|
| A | National road | 1, 2, 3, 4, 5, 6, 7, 8, 9, 10, 11, 12, 13, 14, 15, 16 |
| B | Principal road | 18, 19, 20, 21, 7 |
| C | Principal road | 23, 24, 25, 26, 27, 28, 10, 29, 39, 40 |
| D | Principal road | 41, 42, 27, 43, 8, 49, 50, 51, 52 |
| E | Ordinary road | 4, 53, 54, 56, 43 |

FIG. 3

Example of creating data on the basis of nodes

| Node number | Road 1 | Road 2 | Road 3 | Road 4 |
|---|---|---|---|---|
| 1 | (2, national road) | | | |
| 2 | (1, national road) | (3, national road) | (57, ordinary road) | |
| 3 | (2, national road) | (4, national road) | (58, ordinary road) | |
| 4 | (3, national road) | (5, national road) | (59, ordinary road) | (53, ordinary road) |

ROUTE SEARCHING APPARATUS

FIELD OF THE INVENTION

The present invention relates to a route searching apparatus, and more particularly to a route searching apparatus capable of searching a preferred traveling route between two points and displaying the result of searching on a screen, by specifying a departure point and a destination point on the roads of selected and displayed map information.

BACKGROUND OF THE INVENTION

In the background of increasing automobiles and frequent traffic jams, recently, so-called navigation system is drawing wide attentions (for example, Japanese Laid-open Patent 10300/1984, Japanese Laid-open Utility Model 24200/1992, which is incorporated herein by reference), and in particular the route searching apparatus is noticed together with the position measuring apparatus.

In the conventional route searching system, when the departure point and destination point are entered, first, the range to be searched is determined from the information of the two locations. In consequence, all nodes existing in this searching range are read out from the map information memory means, and the shortest route between the two points is found. Herein, the node is defined to be the flex point entered for the purpose of convenience in the map information in order to express the intersection or curve of the roads.

The time required for calculation of the shortest distance is proportional to the square of the number of nodes within the searching range. Therefore, the longer the distance between the departure point and the destination point, the longer time is taken for calculation, and a memory of large capacity is needed for calculation. Still more, since the system is mainly designed to deduce the shortest distance, it is highly possible that the result of search contrary to the expectation of the driver - wishing to drive wide highway, avoiding narrow local road —may be produced, and the obtained routes were often useless.

According to the Japanese Laid-open Utility Model 85000/1990, which is incorporated herewin by reference, nodes existing in a range of a specific width around the line linking the departure points and destination points are selected, and links containing broader roads are selected from the nodes existing in this range, and therefore routes comprising broader roads are searched.

In this method, if the distance between the departure point and destination point is very long, nodes are selected by limiting to a range of a specific width (ΔD). Therefore, if there is a broad trunk line at a position slightly remote from this range, the road is out of the searching range, and is not displayed as shortest route and hence not used.

SUMMARY OF THE INVENTION

It is a primary object of the invention to present a route searching apparatus capable of determining and displaying a preferred traveling route between points in a short time, by entering a departure point and a destination point on the roads of a displayed map.

It is other object of the invention to present a route searching apparatus enabling to use a small-scale memory capable of determining and displaying a preferred traveling route between two points in a short time by entering a departure point and a destination point on the roads of a displayed map.

It is a further object of the invention to present a route searching apparatus capable of displaying a preferred traveling route including a trunk road, if located near two points, by entering a departure point and a destination point on the roads of a displayed map.

To achieve the above objects, a preferred embodiment of the invention relates to a route searching apparatus comprising map information memory means for storing map information, display means for displaying map information on a screen, input means for entering a departure point and a destination point on the roads of map information, route searching means for searching a route from the departure point to the destination point, and control means for controlling the route searching means and display means on the basis of the map information read out from the map information memory means and information from the input means, wherein the route searching means and control means process logic judgement comprising a step of finding a line segment for linking the departure point and destination point, a step setting a searching range on the basis of the distance of the obtained line segment, a step of judging if there is a trunk road or not in the searching range, a step of setting a first node closest to the departure point on the trunk road, if there is trunk road in the searching range, and a second node closest to the destination point at intermediate passing points, a step of searching the shortest route between the departure point and the first node, and a step of searching the shortest route between the destination point and the second node.

In this constitution, first, the line segment linking the departure point and destination point is determined, and the searching range is limited on the basis of the line segment, and therefore the number of nodes to be calculated is rationally limited. Hence, if the distance from the departure point to the destination point is very long, the time required for calculation is curtailed, and a memory of small capacity can be used in the apparatus. If there is no trunk road on the line segment, as far as there is a trunk road within the searching range set in an arbitrary width, the route is searched in consideration of use of such road, so that a practical route can be searched. Moreover, since an appropriate route between the departure point and the nearest node on the trunk road, and an appropriate road between the destination point and the nearest node on the trunk road are automatically displayed, so that a road searching apparatus very convenient for the user is presented.

Other objects and effects of the invention may be clarified in the following detailed description.

DESCRIPTION OF THE PREFERRED EMBODIMENTS

An exemplary embodiment of a car navigation system employing the route searching apparatus of the present invention is described below.

Figure 1:
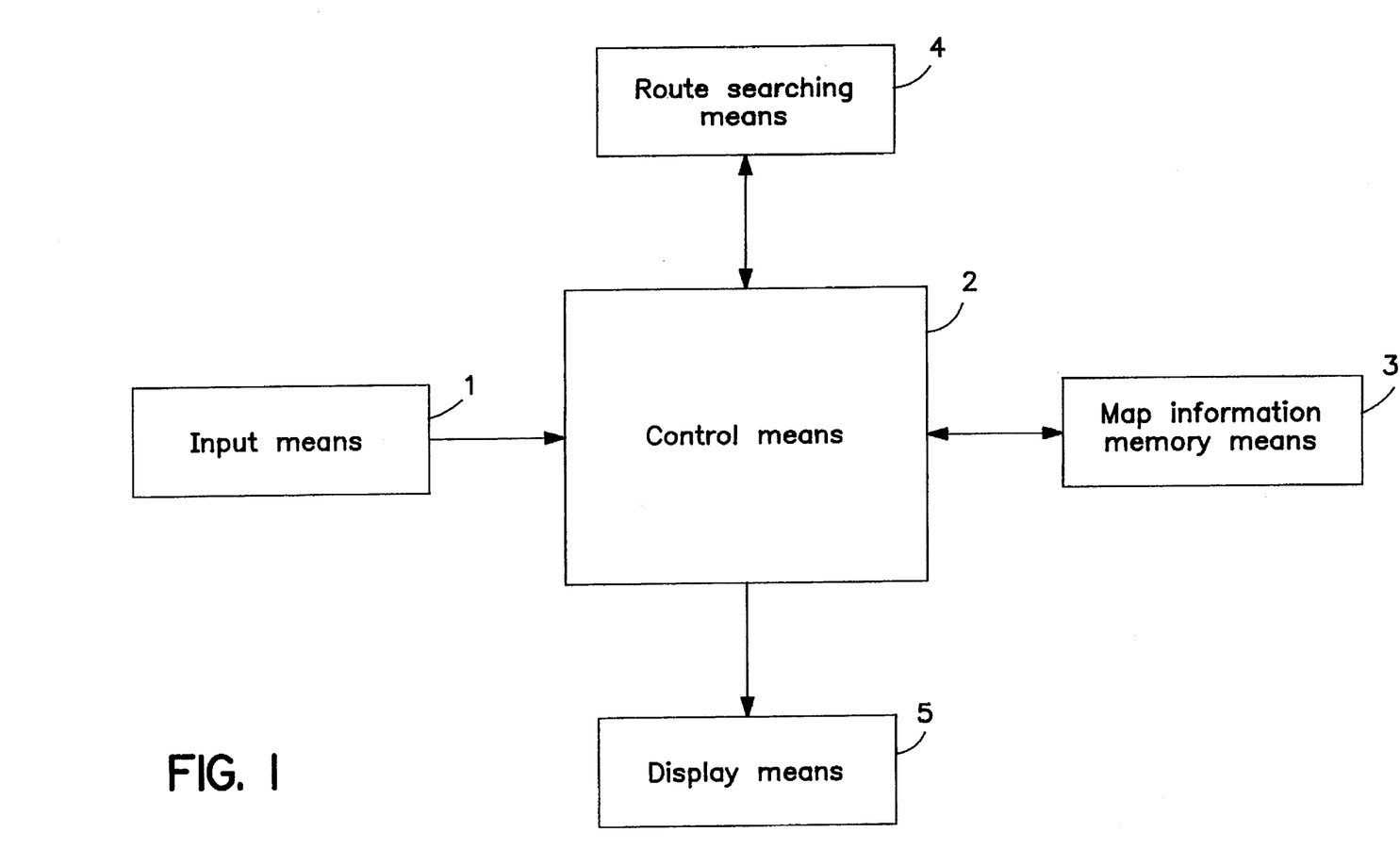
FIG. 1 is a block diagram showing a principal constitution of an exemplary embodiment of car navigation system employing a route searching apparatus of the invention.

FIG. 1 is a block diagram showing the constitution of principal parts of the car navigation system of the embodiment. Input means 1 comprising a keyboard possessing a function for entering the information about destination point and departure point to control means 2. Map information memory means 3 contains a CD-ROM storing the map information. Route searching means 4 determines a practical route between the departure point and title destination point, together with the control means 2. Display means 5 is composed of LCD or the like, and the map information, departure point, destination point, and searched route are displayed on the screen.

Figure 2:
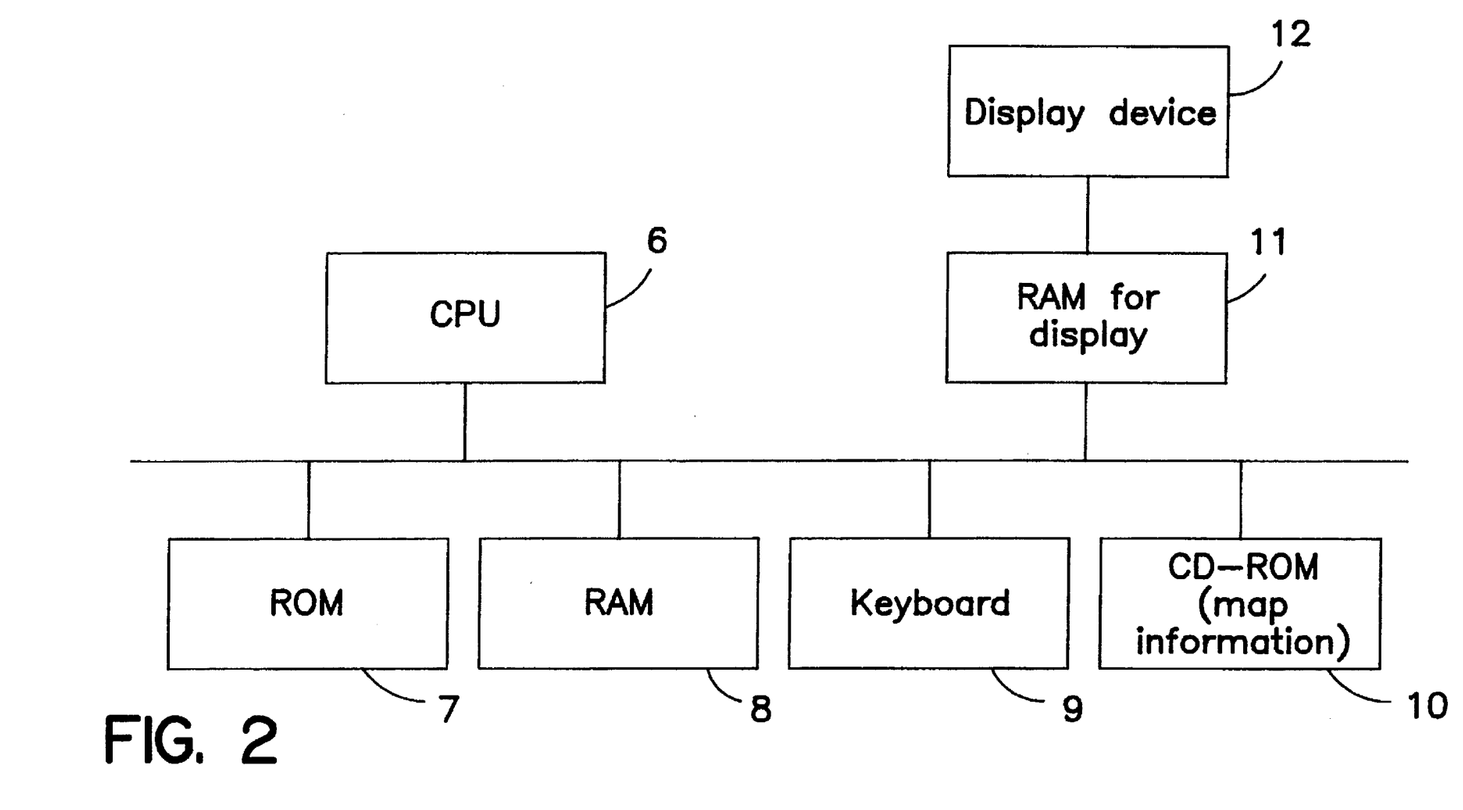
FIG. 2 is a block diagram showing a hardware constitution of an exemplary embodiment of car navigation system employing the invention.

A specific hardware configuration comprises, as shown in FIG. 2, CPU 6, ROM 7, RAM 8, keyboard 9, CD-ROM 10 storing map information, display RAM 11, and display unit 12.

Figure 3:
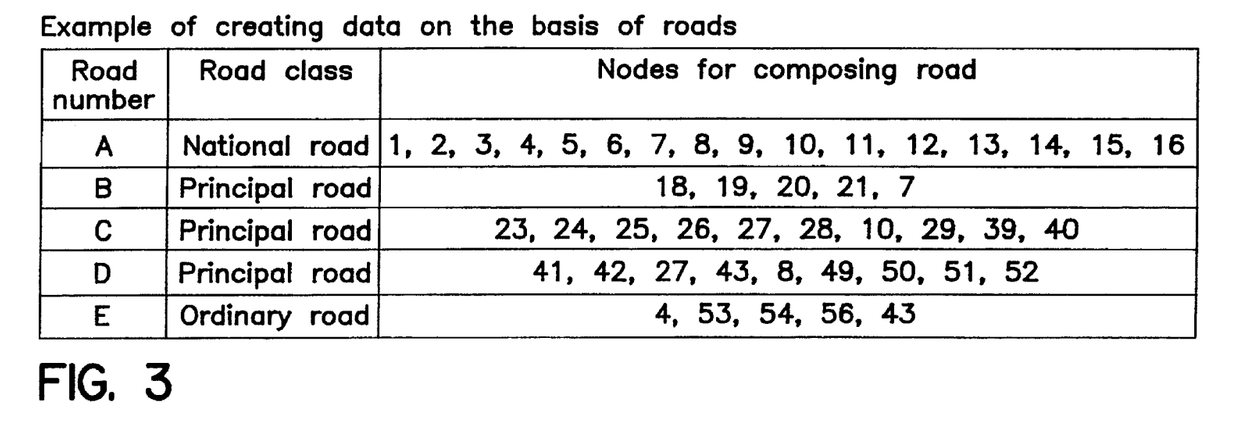
FIG. 3 is an explanatory diagram showing an example of node information stored in layers in map information memory means in the exemplary embodiment.
Figure 5:
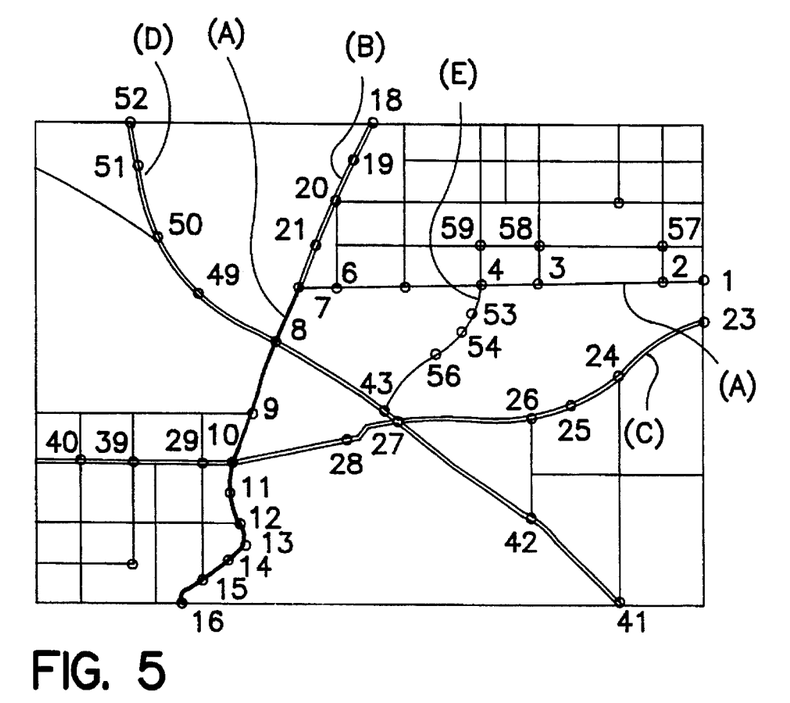
FIG. 5 is a schematic diagram for explaining an example of node information on map stored in the map information memory means.

The CD-ROM 10 stores map information in various scales so as to be selected. Also in the CD-ROM 10, the information of each node in the map information (hereinafter called node information) is stored in layers. FIG. 5 shows an example of node information on map. The node information as shown in FIG. 5 is stored in layers in the CD-ROM 10 as shown in FIG. 3. That is, the node information is stored by dividing into layers depending on the grade of the road through which the road passes, such as the first layer including only the nodes on the national highway, the second layer including the nodes on the prefectural roads or principal local roads, and the third layer including all other roads except for these principal roads. In the examples shown in FIG. 3 and FIG. 5, the road indicated by reference symbol A is a national road belonging to the first layer, and the nodes for composing the road A are (1, 2, 3, ...). The road indicated by reference symbol B is principal local road belonging to the second layer, and the nodes for composing the road B are (18, 19, 20 ...). The road indicated by reference symbol E is an ordinary road belonging to the third layer, and the nodes for composing the road are (4, 53, 54, ...).

Figure 4:
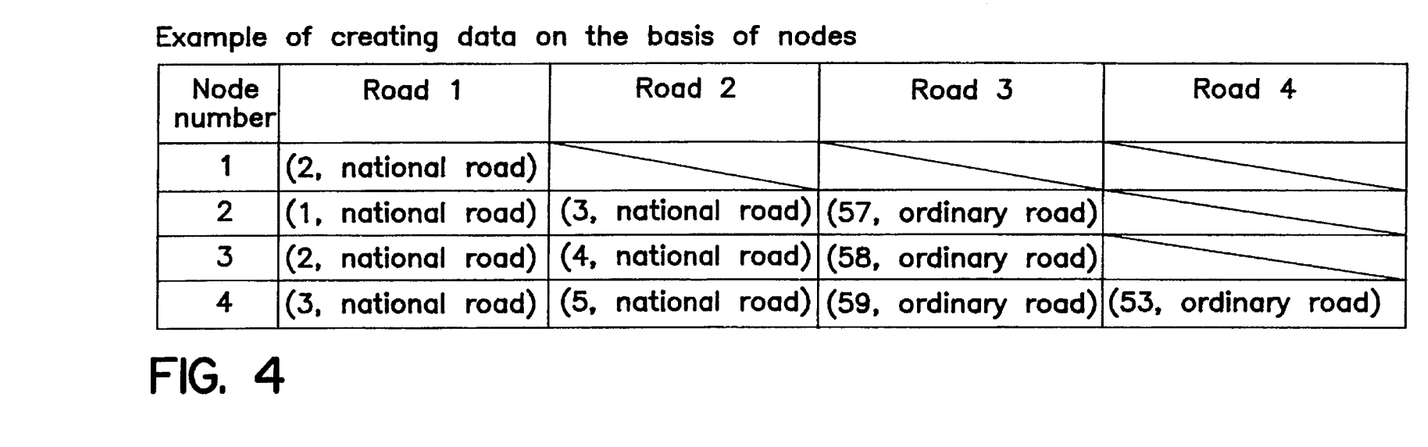
FIG. 4 is an explanatory diagram showing an example of converting layered node information so as to be easy to search in the exemplary embodiment.

In FIG. 4 the node information stored in layers as shown in FIG. 3 is converted so as to be searched easily. When searching the shortest route, prior to search processing, the node information read out from the CD-ROM is converted into the format as shown in FIG. 4, and is stored in the RAM 8. That is, in every node, the other node number adjacent to the node and the road class data relative to the node are classified into groups. For example, the node adjacent node 1 is node 2, and the class of the road between node 1 and node 2 is a national road. The nodes adjacent to node 2 are node 1, node 3 and node 57, and the class of the road between node 2 and node 1 is a national road, the road between node 2 and node 3 is also a national road, and the road between node 2 and node 57 is an ordinary road. When searching the shortest route, it is thus convenient to use the converted format as shown in FIG. 4.

The operation of the car navigation system is explained below. When the user sets a CD-ROM 10 storing map information into the route searching apparatus and turns on the power switch, the map information is read out, and the map information is displayed on the screen of the display unit 12 having an LCD.

In the display unit 12, the map and pointer cursor are displayed by the control means. The user can move the pointer cursor by the key operation of the keyboard 9, and the map on the screen is scrolled by this move. When a signal for changing the scale of the map is entered through the keyboard 9, a map of a different scale stored in the CD-ROM 10 is read out, and displayed on the screen of the display unit 12. Therefore, the user can pick up desired map information, and specify two desired points on the map displayed on the screen.

The route search process is described below.

When searching the route, the user selects "route search" from the menu, and enters the departure point and destination point according to the instruction displayed on the screen of the display unit 12. If there is no road at the point indicated by the user by using the pointer cursor on the screen of the display unit 12, the apparatus is designed to set the departure point and destination point on the road closest to the point of the pointer cursor, and the user is not demanded to adjust the pointer cursor precisely on the road.

Figure 6:
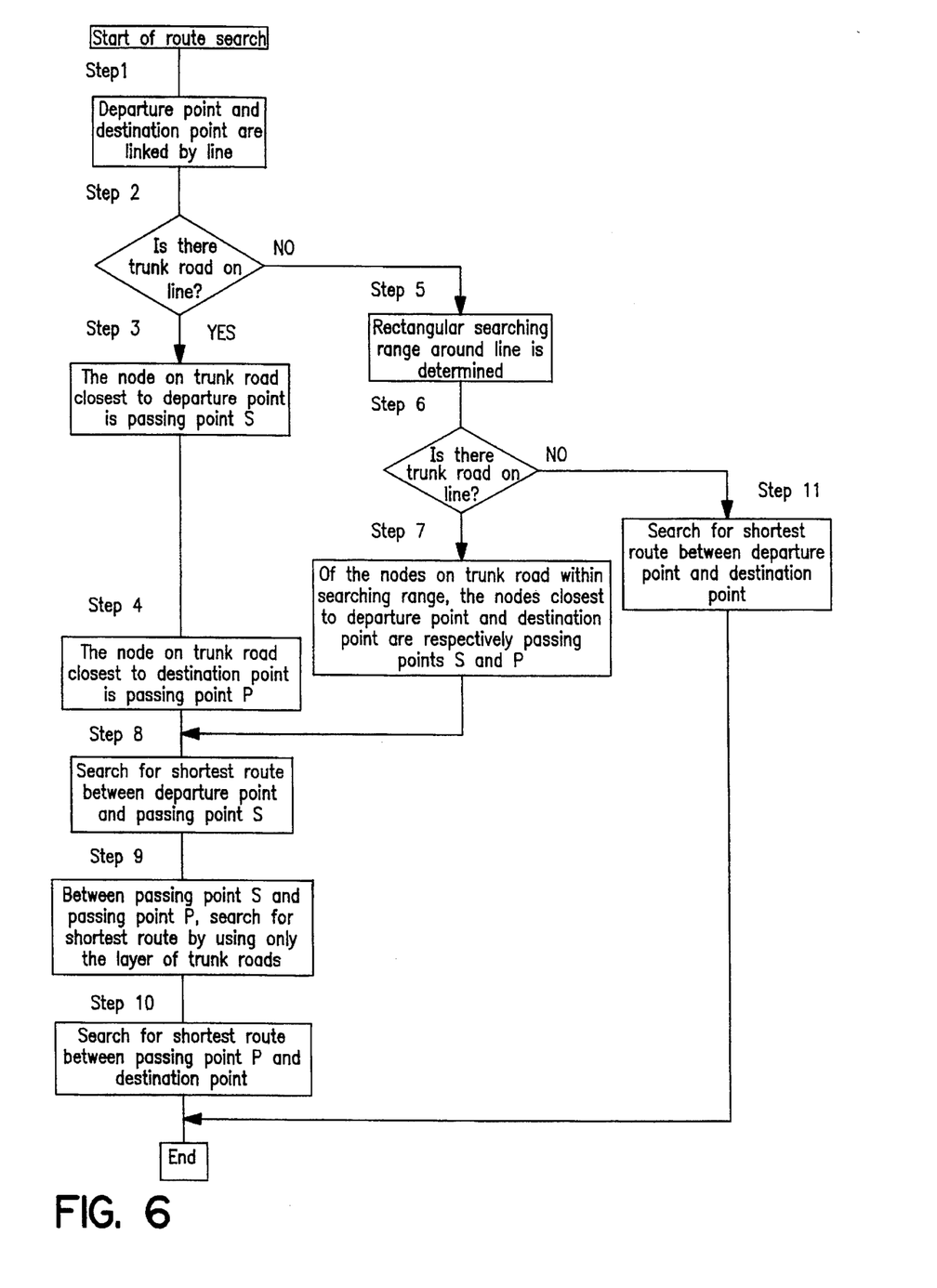
FIG. 6 is a flow chart of route searching process in an exemplary embodiment of car navigation system of the present invention.

The logic judging process by the CPU 6 and others is explained below while referring to the flow chart in FIG. 6 and other diagrams.

Figure 7:
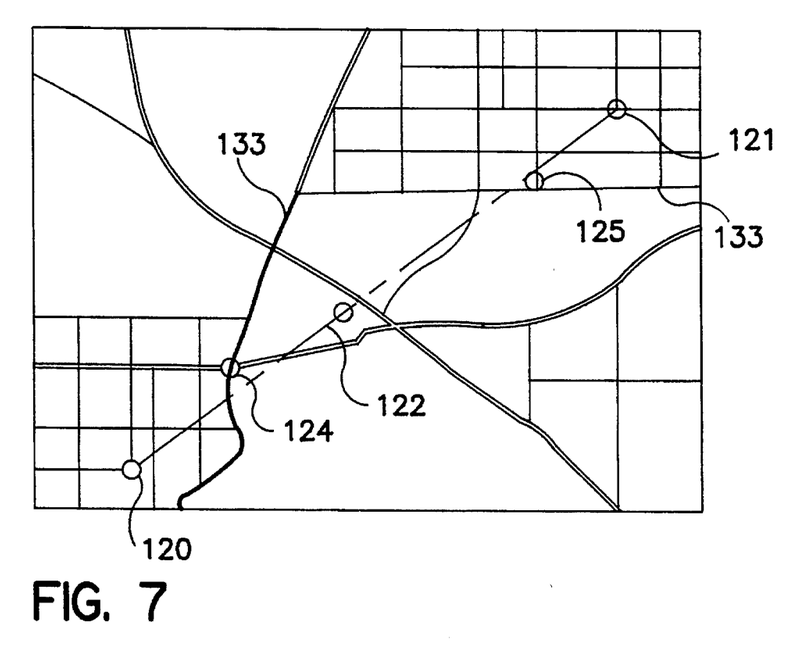
FIG. 7 is a schematic diagram of map relating to route searching process in an exemplary embodiment of car navigation system employing the invention.

At step 1, the control means 2 determines a line segment 122 for linking the departure point 120 and destination point 121 in FIG. 7.

At step 2, the control means 2 searches the map information along the determined line segment 122, and judges if there is a trunk road or not on the line segment 122. When a trunk road 133 is present as shown in FIG. 7, at step 3, a node 124 on the trunk road 133 on the departure side closest to the line segment 122 is determined as the passing point S for entering the trunk road 133. At step 4, a node 125 on the trunk road 133 at the destination side closest to the line segment 122 is determined as the passing point P for leaving the trunk road 133, and the process advances to step 8.

Figure 8:
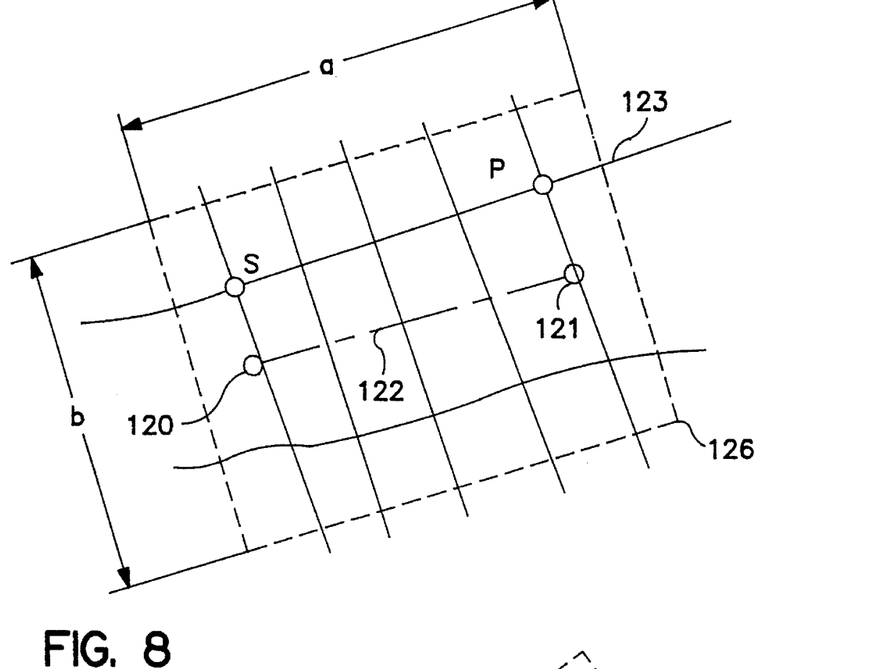
FIG. 8 is a schematic diagram for explaining the route searching process in the exemplary embodiment.

If there is no trunk road on the line segment 122, a rectangular searching range on the basis of the line segment 122 is determined by the control means 2 at step 5. For example, a searching range 126 is set as indicated by broken line in FIG. 8. The searching range 126 is a rectangular area around the line segment 122, and possesses, for example, a longer side a in a distance corresponding to 1.2 times the line segment 122 linking the departure point 120 and destination point 121, and a shorter side b in a distance corresponding to 0.8 times the line segment.

At step 6, when it is judged that a trunk road is present in the searching range 126, the process advances to step 7. At step 7, the node on the trunk road in the searching range 126, being closest to the point 120 is selected as the passing point S, and the node closest to the departure point 121 is selected as the passing point P.

Figure 9:
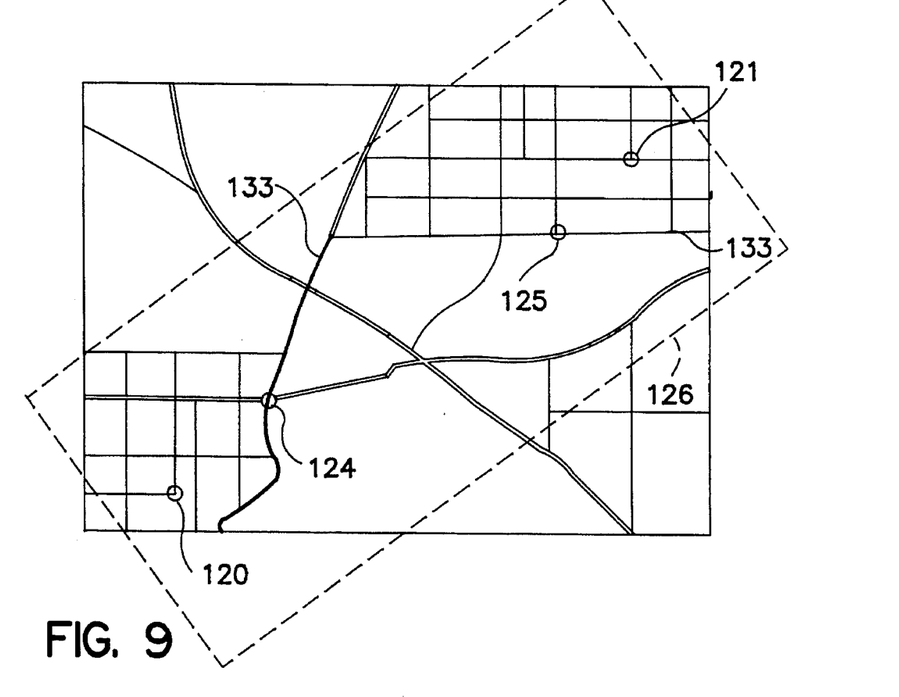
FIG. 9 is a schematic diagram relating to route searching process in the exemplary embodiment.

In the case of the map shown in FIG. 7, the searching range 126 is set as indicated by broken line in FIG. 9. In this example, the node 124 is set as the passing point close to the departure point 120 of the trunk road 133 (Route A), and the node 125 as the passing point close to the destination point 121 of the trunk road 133 (Route A).

Figure 10A:
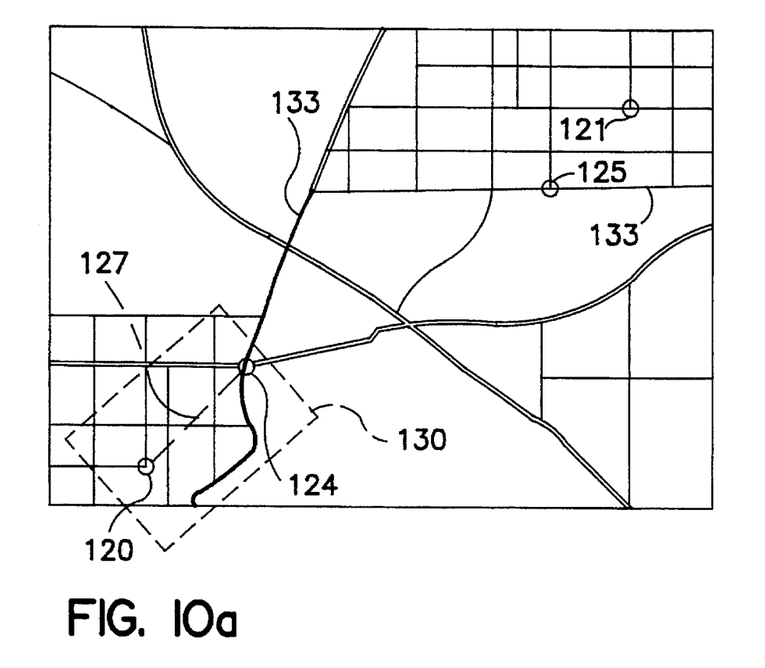
FIGS. 10(a) and 10(b) are schematic diagrams of a map relating to the route searching process in the exemplary embodiment.
Figure 10B:
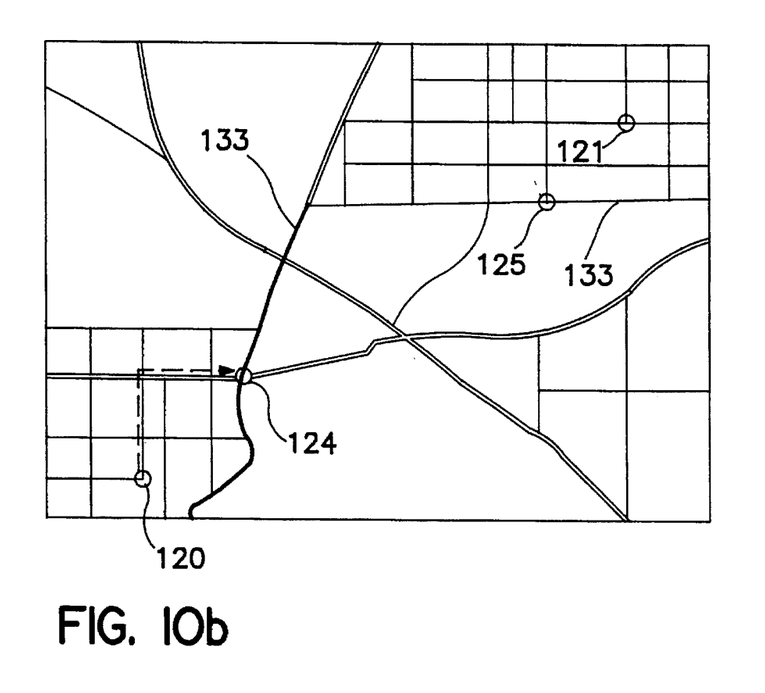

At step 8, the shortest route between the departure point 120 and node 124 is searched. That is, same as the processing at step 5, in the case of the map shown in FIG. 7, a rectangular searching range 130 is set around a line segment 127 linking the departure point 120 and node 124 as shown in FIG. 10(a). Herein, all road information in the searching range 130 is searched. That is, as shown in FIG. 3, the node information stored in the CD-ROM 10 in layers is searched within the searching range 130, and converted into the form as shown in FIG. 4, and stored in the RAM 8. On the basis of the converted data, the shortest route between two points is determined as indicated by broken line in FIG. 10(b). Generally, the converting process for converting into the form shown in FIG. 4 requires a relatively long calculation time, and a memory of large capacity is needed. However, in the embodiment, it is intended to convert by limiting to the searching range 130 depending on the length of the line segment 127 linking the departure point 120 and node 124, and hence as compared with the case of searching the whole region, the calculation time is shorter, so that a memory of smaller scale can be used.

Figure 11A:
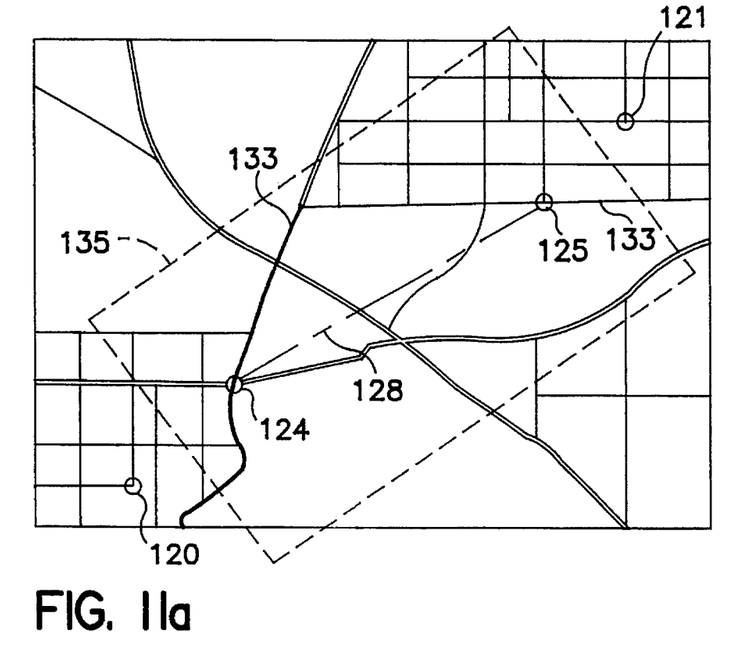
FIGS. 11(a) and 11(b) are schematic diagrams relating to the route searching process in the exemplary embodiment.

At step 9, the shortest route is searched by using the layer to which the trunk road belongs, that is, only the first layer, between the node 124 and the node 125. The searching range is limited same as in step 8, and a rectangular searching range 135 is set around a line segment linking the node 124 and node 125 as shown in FIG. 11(a).

Figure 11B:
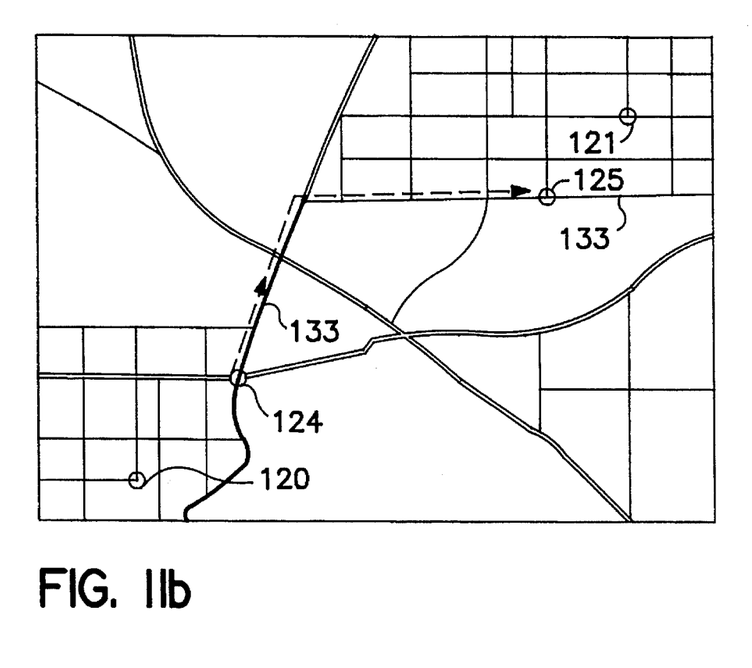

In the map information in the range limited in the searching range 135, only the trunk roads are selected, and therefore the shortest route passing only the trunk road 133 selected as indicated by broken line in FIG. 11(b) can be determined.

Figure 12A:
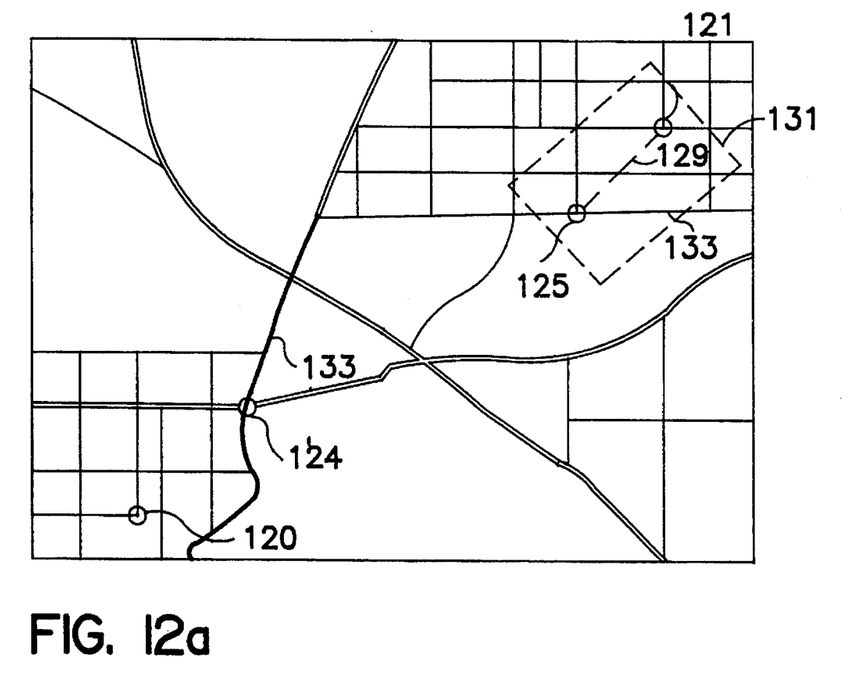
FIGS. 12(a) and 12(b) are schematic diagrams of maps relating to the route searching process in the exemplary embodiment.
Figure 12B:
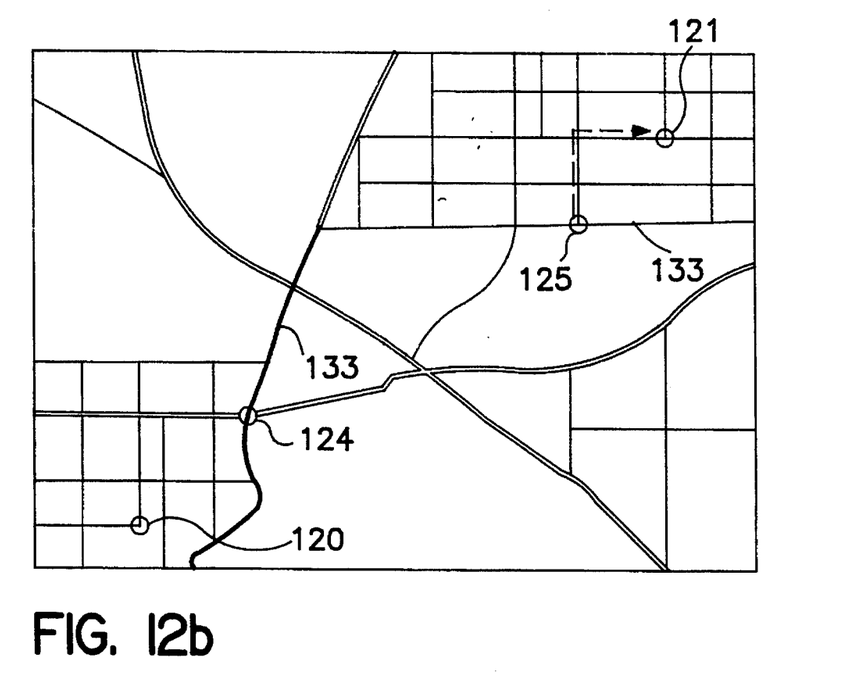

At step 10, as shown in FIG. 12, the shortest route between the node 125 on the trunk road 133 and the destination point 121 is searched. In this search, similarly as in step 8, a rectangular searching range 131 is set around a line segment 129 linking the node 125 and the destination point 121 as shown in FIG. 12(a). All road information in the searching range 131 is searched. That is, as shown in FIG. 3, only the node information stored in the CD-ROM 10 in layers included in the searching range 131 is searched, and the searched information is converted into the form as shown in FIG. 4, and stored in the RAM 8. On the basis of the converted data, the shortest route between the two points is determined as indicated by broken line in FIG. 12(b). This conversion process is also limited to the searching range depending on the line segment linking the node 125 and destination 121, and the calculation time is shorter as compared with the case of processing the whole region, so that a memory of small scale can be used.

Figure 13:
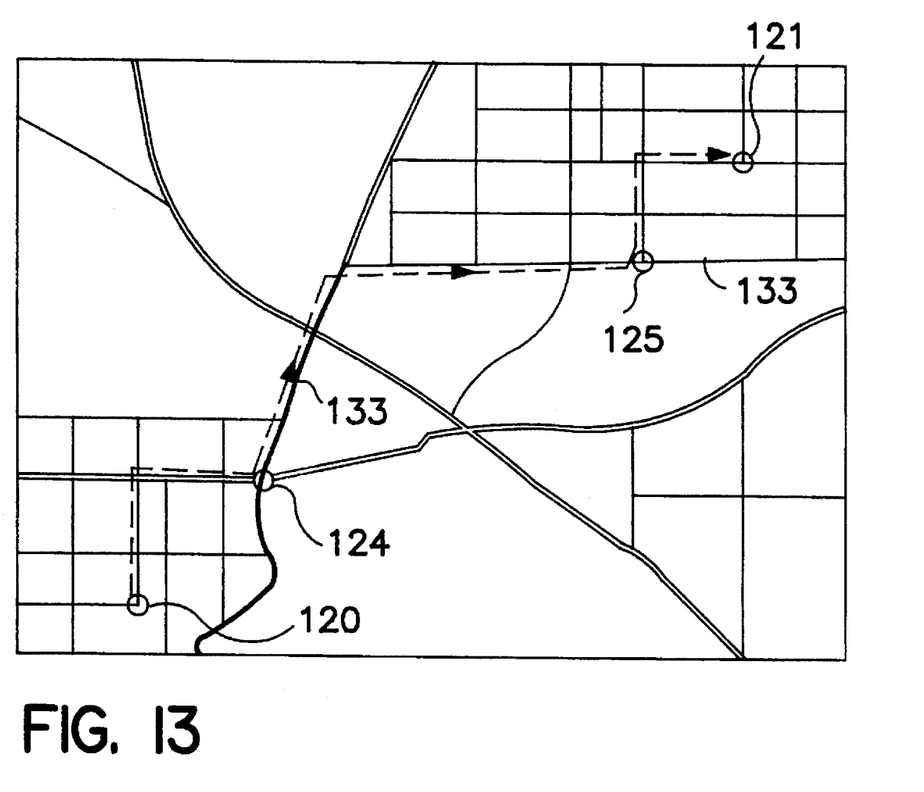
FIG. 13 is a schematic diagram showing the map displaying the route determined in an exemplary embodiment of the invention.

As a result of a search in three layers in this way, the obtained route is displayed on the screen of the display means 5. That is, the route indicated by broken line in FIG. 13 is displayed.

At step 6, if there is no trunk road 133 within the rectangular searching range 126, the shortest route between the departure point 120 and destination point 121 is determined at step 11.

In the embodiment, the searching range is a rectangular area around the line segment, and an example possessing a longer side of 1.2 times the line segment and a shorter side of 0.8 times the line segment is used, but the shape and distance are not limited to this example alone.

Therefore, if there is no node of trunk road on the line segment linking the departure point and destination point, by expanding and setting the searching range on the basis of the line segment, the presence or absence of trunk road is judged, so that a very practical route searching by effectively making use of trunk roads may be realized. Moreover, since the nodes in a limited range are searched, the time required for calculation is shortened, and the memory capacity can be saved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A route searching apparatus comprising:

map information memory means for storing map information;

display means for displaying said map information;

input means for entering a departure point and a destination point;

route searching means for searching and determining a route from the departure point to the destination point; and control means for displaying the route determined by the route searching means in the display means by overlapping said route on the map information;

wherein the route searching means includes;

means for setting a searching range including both the departure point and the destination point, means for judging if there is a trunk road in the searching range or not by searching only the nodes on the trunk road among the nodes existing in the searching range, wherein a road between each node is assigned a class and said trunk road corresponds to a road having a specific class;

means for setting the closest node to the departure point as a first node and the closest node to the destination point as a second node, among the nodes on the trunk road if the trunk road is present in the searching range, and setting the first node and second node as intermediate passing points, means for searching the shortest route from the departure point to the first node, and means for searching the shortest route from the destination point to the second node.

2. A route searching apparatus of claim 1, further comprising:

node information memory means for storing node information used by said route searching means corresponding to the map information stored in the map information memory means, wherein the node information stored in the node information storing means is in layers depending on the class of the road which passes each node.

3. A route searching apparatus comprising:

map informations memory means for storing map information;

display means for displaying said map information on a screen;

input means for entering a departure point and a destination point;

route searching means for searching and determining a route from the departure point to the destination point; and control means for displaying the route determined by the route searching means in the display means by overlapping said route on the map information;

wherein the route searching means includes;

means for finding the line segment linking the departure point and destination point, means for setting a searching range including both the departure point and the destination point on the basis of the distance of the determined line segment, means for judging if there is a trunk road in the searching range or not by searching only the nodes on the trunk road among the nodes existing in the searching range, wherein a road between each node is assigned a class and said trunk road corresponds to a road having a specific class, and means for searching and determining the route from the departure point to the destination point within the searching range, said route including said trunk road if a said trunk road exists within the searching range.

4. A route searching apparatus of claim 3, wherein the step for setting the searching range sets a rectangular searching range of which one side has a distance obtained by multiplying the distance of the line segment linking the departure point and the destination point by a first factor, and the other side has a distance obtained by multiplying the distance of the line segment by a second factor.

5. A route searching apparatus of claim 4, further comprising:

node information memory means for storing the node information used by said route searching means corresponding to the map information stored in the map information memory means, wherein the node information stored in the node information storing means is in layers depending on the class of the road.

6. A route searching apparatus comprising:

map information memory means for storing map information;

display means for displaying said map information on a screen;

input means for entering a departure point and a destination point on the roads of the map information;

route searching means for searching a route from the departure point to the destination point; and control means for controlling the route searching means and display means on the basis of the map information read out from the map information memory means and information from the input means;

wherein the route searching means includes:

means for finding a line segment for linking the departure point and the destination point in order to incorporate the closest trunk road in the searching route from the destination point to the departure point, wherein the road between each node is assigned a class and said closest trunk road corresponds to a road having a specific class;

means for setting a searching range on the basis of the distance of the obtained line segment, means for judging if there is a trunk road or not in the searching range by searching only the nodes on the trunk road among the nodes existing in the searching range, means for setting the node closest to the departure point on the trunk road as a first node, if there is trunk road in the searching range, and the node closest to the destination point as second node, and setting the first node and second node as intermediate passing points, means for searching the shortest route between the departure point and the first node, and means for searching the shortest route between the destination point and the second node.

7. A route searching apparatus of claim 6, further comprising:

node information memory means for storing the node information used by said route searching means corresponding to the map information stored in the map information memory means, wherein the node information stored in the node information storing means is in layers depending on the class of the road which passes each node.

* * * * *

UNITED STATES PATENT AND TRADE MARK OFFICE
CERTIFICATE OF CORRECTION

PATENT NO.   : 5,506,779
DATED        : April 9, 1996
INVENTOR(S)  : Kanki

It is certified that error appears in the above-identified patent and that said Letters Patent is hereby corrected as shown below:

On the title page, item [57] Abstract, line 9, the word "preliminary" should be --preliminarily--.

Column 7, line 40, delete "a".

Signed and Sealed this

Nineteenth Day of November, 1996

Attest:

BRUCE LEHMAN

*Attesting Officer*    *Commissioner of Patents and Trademarks*